(12) United States Patent
Edwards

(10) Patent No.: US 11,230,149 B2
(45) Date of Patent: Jan. 25, 2022

(54) ANTI-RATTLE DEVICE FOR TRAILER HITCH

(71) Applicant: HORIZON GLOBAL AMERICAS INC., Plymouth, MI (US)

(72) Inventor: Jonathan Edwards, Oswestry (GB)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 344 days.

(21) Appl. No.: 16/323,657

(22) PCT Filed: Aug. 2, 2017

(86) PCT No.: PCT/US2017/045088
§ 371 (c)(1),
(2) Date: Feb. 7, 2019

(87) PCT Pub. No.: WO2018/031338
PCT Pub. Date: Feb. 15, 2018

(65) Prior Publication Data
US 2019/0168552 A1 Jun. 6, 2019

Related U.S. Application Data

(60) Provisional application No. 62/372,040, filed on Aug. 8, 2016.

(51) Int. Cl.
*B60D 1/24* (2006.01)
*B60D 1/06* (2006.01)
(Continued)

(52) U.S. Cl.
CPC ............... *B60D 1/241* (2013.01); *B60D 1/06* (2013.01); *B60D 1/065* (2013.01); *B60D 1/583* (2013.01); *B60D 1/60* (2013.01)

(58) Field of Classification Search
CPC ........ B60D 1/241; B60D 1/065; B60D 1/583; B60D 1/60; B60D 1/28
(Continued)

(56) References Cited

U.S. PATENT DOCUMENTS 3,287,028 A * 11/1966 Dorge ...................... B60D 1/52
280/495
4,131,295 A * 12/1978 Highberger .............. B60D 1/26
280/475
(Continued)

FOREIGN PATENT DOCUMENTS

DE   102007003773 A1 * 7/2008  ............... B60D 1/06
EP       2236322 A1 * 10/2010  ............... B60D 1/52
KR       1707000 B1 *  3/2016

OTHER PUBLICATIONS

International Search Report and Written Opinion dated Nov. 27, 2017; International Patent Application No. PCT/US2017/045088 filed Aug. 2, 2017. ISA/US.

*Primary Examiner* — Minnah L Seoh
*Assistant Examiner* — Myles A Harris
(74) *Attorney, Agent, or Firm* — McDonald Hopkins LLC

(57) ABSTRACT

An anti-rattle hitch device is described. A rotating barrel pin is positioned proximate to the normal accessory port of receiving hitch housing. The pin cooperates with resilient bushings that are engineered to compress in overload situations, while urging the accessory drawbar flush against the upper, inner facing of the housing when the device is engaged under normal conditions. The resulting apparatus prevents unwanted rattling and play of the hitch and accessory without the need for loose or removable parts.

16 Claims, 3 Drawing Sheets

(51) Int. Cl.
  *B60D 1/58* (2006.01)
  *B60D 1/60* (2006.01)
(58) Field of Classification Search
  USPC .......................................... 280/506, 483, 507
  See application file for complete search history.

(56) References Cited

U.S. PATENT DOCUMENTS

| | | | |
|---|---|---|---|
| 5,823,560 A | 10/1998 | Van Vleet | |
| 6,010,144 A * | 1/2000 | Breslin | B60D 1/155 |
| | | | 280/491.5 |
| 6,131,938 A | 10/2000 | Speer | |
| 6,357,780 B1 | 3/2002 | Young | |
| 7,635,247 B2 * | 12/2009 | Collins | B60R 9/06 |
| | | | 414/462 |
| 7,726,681 B2 * | 6/2010 | McKendry | B60D 1/52 |
| | | | 280/506 |
| 8,016,314 B2 * | 9/2011 | Visser | B60D 1/52 |
| | | | 280/511 |
| 8,079,612 B1 | 12/2011 | Tambornino | |
| 8,231,035 B1 * | 7/2012 | Michael | B60D 1/60 |
| | | | 224/403 |
| 8,534,696 B2 * | 9/2013 | Di Parma | B60D 1/52 |
| | | | 280/506 |
| 8,944,516 B2 * | 2/2015 | Eidsmore | B60P 1/28 |
| | | | 298/1 A |
| 9,102,204 B1 * | 8/2015 | Hooke | B60D 1/58 |
| D773,280 S * | 12/2016 | Rathman | D8/330 |
| 9,902,224 B2 * | 2/2018 | Rathman | B60D 1/60 |
| 10,005,329 B2 * | 6/2018 | Phillips | B60D 1/58 |
| 10,099,525 B1 * | 10/2018 | Phillips | B60D 1/26 |
| 2007/0262563 A1 | 11/2007 | Williams | |
| 2007/0290483 A1 * | 12/2007 | Visser | B60D 1/60 |
| | | | 280/507 |
| 2009/0322061 A1 * | 12/2009 | Rodriguez | B60D 1/60 |
| | | | 280/507 |
| 2012/0217724 A1 * | 8/2012 | Works | B60D 1/06 |
| | | | 280/490.1 |
| 2015/0076793 A1 * | 3/2015 | Belinky | B60D 1/241 |
| | | | 280/506 |
| 2015/0343866 A1 * | 12/2015 | Williams | B60D 1/52 |
| | | | 29/525.04 |
| 2019/0070917 A1 * | 3/2019 | Nance | B60D 1/58 |
| 2019/0315168 A1 * | 10/2019 | Rotenberg | B60D 1/52 |
| 2020/0180373 A1 * | 6/2020 | Lee | B60D 1/485 |

* cited by examiner

ANTI-RATTLE DEVICE FOR TRAILER HITCH

RELATED APPLICATION AND TECHNICAL FIELD

This application is a 35 U.S.C. 371 national stage filing of and claims priority to International Application No. PCT/US2017/045088 filed on Aug. 2, 2017, which claims priority to U.S. Provisional Patent Application Ser. No. 62/372,040, filed on Aug. 8, 2016, each of which are incorporated herein by reference in their entirety.

The present invention relates generally to trailer hitches and, more specifically, to an apparatus that reduces unwanted movement of an accessory, as well as the noise and attendant issues caused by such movement, within the receiving hitch.

BACKGROUND

Ball-type hitches are a common means for providing a connection between a trailer and a towing vehicle. Such hitches are typically detachable from the towing vehicle, but in some instances may be permanently affixed to the towing vehicle.

Detachable hitches and other accessories are commonly attached to the towing vehicle via a rigid rectangular sleeve mounted on the rear of the vehicle. This sleeve is usually attached to the vehicle frame via supporting structure that is commonly referred to as the receiver hitch. A rectangular shaft of the detachable hitch is called the draw bar.

The draw bar on a detachable hitch or other hitch-mounted accessory is slightly smaller than the sleeve so as to slide into the sleeve of the receiver hitch. A pin or bolt is then inserted through matching holes in the sidewalls of the sleeve and shaft of the draw bar. A cotter pin, lock, or other fastening means may be employed to prevent the pin or bolt from slipping out of the holes.

Detachable hitches are often utilized because they address problems associated with functionality, convenience, and aesthetics. Hitches need to extend beyond the rear of the towing vehicle to enable attachment of the trailer to the hitch, and to permit the trailer to pivot freely relative to the towing vehicle. Further, a receiver hitch allows for a wide range of options to modify the capabilities of the towing vehicle, including towing/trailering by way of a hitch ball or other similar attachments, cargo carrying via a hitch-mounted box or platform, and/or transporting of bicycles, watercraft, motorcycles, and the like. Such a protruding hitch with its ball or other attachment, however, can be unsightly when the vehicle is used without the trailer or other accessories attached.

Some space is desirable between the walls of the sleeve and the walls of the shaft to allow easy attachment and detachment of the hitch. For the same reason, space is usually left between the ball and the ball receiver housing. These spaces permit ease of coupling and decoupling between the sleeve and the walls of the shaft. In similar fashion, space between the ball and the ball coupler or tongue housing facilitates ease of coupling and decoupling between the ball and ball coupler or tongue housing despite imperfections in the machining of those elements and despite dirt and other surface accumulations.

The problem with these spaces is that they allow motion (i.e., "play") in the connection between the hitch and the sleeve and ball and the ball receiver housing that can be noisy, annoying, and inconvenient. The play between the walls of the hitch and sleeve can cause clanging noises and vibrations that can be felt and/or heard by operators and passengers within the towing vehicle. That play may also be magnified by the lever arm of the hitch so that it is felt more strongly by the trailer and its passengers. That same play may also increase wear on various parts of the mechanisms attaching the trailer to the towing vehicle, leading to undesirable wear and fatigue.

A device that eliminates the free play movement and direct physical contact between a ball mount shaft/draw bar and hitch receiver would be welcome, as would a means for reducing free play, movement, and direct physical contact between the ball mount and the ball mount coupler.

In fact, a number of solutions have been proposed to address these problems. Generally speaking, these solutions fall into one of three categories: threaded pins, sleeves, and wedges.

A threaded pin arrangement 10 is illustrated in FIG. 1A. These arrangements require a hollow shank on the accessory 20. The pin 12 is provided with a spring-loaded block assembly 14. The spring 13 urges the block 15 to engage the inner surface of the accessory 20, while the block 14 includes a threaded aperture (not shown) that cooperates with the connecting pin 16. In operation, the pins 12, 16 are tightened to closely join the accessory 20 to an interior surface of the hitch receiver 30. A locking mechanism 18 may integrated with the connecting pin 16 to deter theft. Such devices 10 are designed to be used with hitch-mounted accessories and, therefore, may not be compatible with towing apparatus or other accessories which are incapable of receiving the pin (e.g., because the shank is not hollow). This arrangement also requires alignment of the pins 12, 16 with the corresponding apertures of the accessory hitch, which may be challenging for some users.

FIG. 1B illustrates a torqueing sleeve 40. Sleeve 40 includes a collar 42 and tab 44. A knob and screw 46 is associated with the tab 44 so that, when the collar fits around the exterior diameter of either the accessory 20 or hitch 30, tightening of the knob and screw 46 creates torque and/or leverage that stabilizes opposing accessory/hitch 20, 30. Typically, sleeve 40 is provided in addition to the standard pin and clip (not shown in this view) that joins the accessory to the hitch. In this regard, the use of sleeve 40 can be constrained by the available exterior surfaces of the hitch and accessory. Additionally, to the extent sleeve 40 relies on applying force between the hitch and accessory, it may become loosened and less effective over time. Finally, sleeve 40 may eventually cause scrapes, scratches, wear, and/or damage to the exterior surfaces it engages, and it may be cumbersome, unwieldly, and unsightly.

FIG. 1C depicts an anti-rattle wedge 50. Wedge section 51 is force-fitted into the gap between the accessory 20 and hitch 30. A leveraging pin 52 may be fitted around the pin and clip 22 of the accessory 20. Pin 52 is threaded at one end so that a nut 54 can be screwed on to urge the wedge into any gap. This arrangement may be advantageously used regardless of whether the accessory has a hollow shank, and the simplicity of its design makes it relatively economical. However, as with the sleeve, wedge 50 gives rise to possible unwanted scrapes, scratches, wear, and/or damage to the accessory shank and/or hitch. Additionally, because the wedge section 51 must be force fit into the gap, installation, tightening, and removal of the nut 54 may be challenging.

In view of these shortcomings, a cost effective design that minimized the possibility for wear and damage to the accessory and the hitch would be welcome. Similarly, a design is needed that integrates with the existing accessory and hitch without loose parts or the need to remove components when not in use, while still permitting simple and easy engagement of the anti-rattle feature when it may be desired.

SUMMARY

A device for reducing play between the hitch receiver and the hitch accessory (e.g., trailer shank, bike rack, cargo carrier, hitch ball, drawbar, etc.) is described.

In one aspect, the device may comprise any combination of the following features:
- a hollow, tubular housing oriented along a longitudinal axis and defined by a receiving aperture at one end, a pair of opposing, transverse side wall sections and a pair of opposing top and bottom wall sections;
- a locking barrel pin port formed within one of the top, bottom, or side walls and extending through to the opposing top, bottom, or side wall;
- at least one compressible bushing lining an interior portion the locking barrel pin port;
- a locking barrel pin having a longitudinal length and at least one section of longitudinal length in which a diameter of the pin varies;
- wherein the locking barrel pin, when inserted in the locking barrel pin port, does not bisect or obstruct a body inserted into the receiving aperture;
- a towing accessory received within the receiving aperture, wherein the locking barrel pin engages an edge the towing accessory without penetrating or passing through the towing accessory;
- a pair of linearly aligned retaining pin ports formed within one of the top, bottom, or side walls and the opposing top, bottom, or side wall associated therewith;
- wherein a transverse line connecting the pair of linearly aligned retaining ports is parallel to the longitudinal length of locking barrel pin when the locking barrel pin is inserted within the locking barrel pin port;
- wherein the at least one section of longitudinal length includes a flattened exterior section and a remaining portion of the longitudinal length is curved;
- wherein the remaining portion of the longitudinal length has a circular cross sectional shape;
- wherein the locking barrel pin has an oval cross sectional shape at the at least one section of longitudinal length;
- wherein the locking barrel pin includes a rotational engagement head at one end;
- wherein the receiving aperture defines a quadrilateral shape; and
- wherein the tubular housing also incorporates the quadrilateral shape along the longitudinal axis.

In another aspect, an anti-rattle system includes any combination of the following features:
- a hollow, tubular housing having an accessory aperture at one end;
- a rotating compression member integrated within a side wall of the housing, oriented on an interior cavity of the housing, and facing an opposing side wall;
- wherein the compression member rotates relative to the side wall to selectively change the distance between the side wall and the opposing side wall along the interior cavity;
- a bushing at least partially encasing the rotating compression member; and
- wherein the housing is integrated as part of a receiver hitch.

In further aspect, the invention may have any combination of the following features:
- a receiving member defined by a plurality of sidewalls surrounding an opening into which a towing accessory may be inserted;
- a pair of retaining apertures formed within opposing sidewalls of the receiving member into which a retaining pin may be inserted so that, when a towing accessory is inserted in the member, the retaining pin passes through the towing accessory to secure it within the receiving member;
- a channel formed in one of the sidewalls;
- a locking barrel pin positioned within the channel;
- wherein the locking barrel pin may be selectively repositioned within the channel so that, when a towing accessory is inserted in the receiving member, the locking barrel pin urges the towing accessory into secured contact with at least one of the plurality of sidewalls not having the channel;
- wherein the locking barrel pin is at least partially encased within a compressible bushing; and
- wherein, when the retaining pin is inserted into the retaining apertures, the retaining pin is oriented parallel to the locking barrel pin.

While individual aspects disclosed herein contemplate the features noted above, it will be understood that features from one aspect may also be combined with those from another aspect. In the same manner, features disclosed or depicted in the drawings or elsewhere in this specification may be added or recombined to form still other aspects not specifically identified above.

DESCRIPTION OF THE DRAWINGS

Operation of the invention may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein.

In the drawings.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Generally speaking, the present system relies on a rotating, cylindrical locking barrel pin integrated along the bottom of the receiving box. When in the engaged position, this pin urges the accessory shank into a flush position with the receiver across its entire transverse facing (i.e., along the entire length of the pin). A relatively flat section may be provided along the length of the pin cylinder on one side to allow for load release. The flattened section also avoids any camming action that might otherwise back drive the pin. When the flattened section of the pin faces the accessory, the system is in a disengaged position, but without the need to remove parts from the anti-rattle device. The rotation of the pin may be engaged and disengaged by using a standard wrench to rotate a nut-shaped head on a protruding end of the pin through a range of motion, preferably 180 degrees.

Bushes provided around the pin eliminate its unwanted movement or rattling. Through appropriate materials selection, the bushings will compress under sufficiently large loads to allow the accessory to come into contact with the lower portion of the receiver to avoid overloading of the bushes and to ensure long service life for the device itself. Nevertheless, the bushing are sufficiently resilient to allow for normal operation when the excessive load is removed.

Figure 1A:
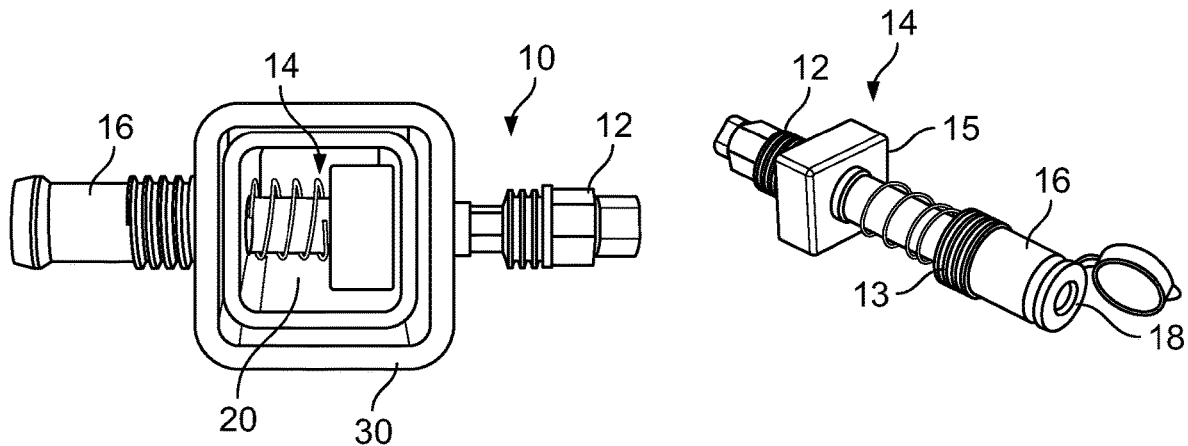
FIG. 1A shows a sectional cutaway view of a first prior art device, in combination with a three dimensional perspective view of the threaded pin in that device.
Figure 1B:
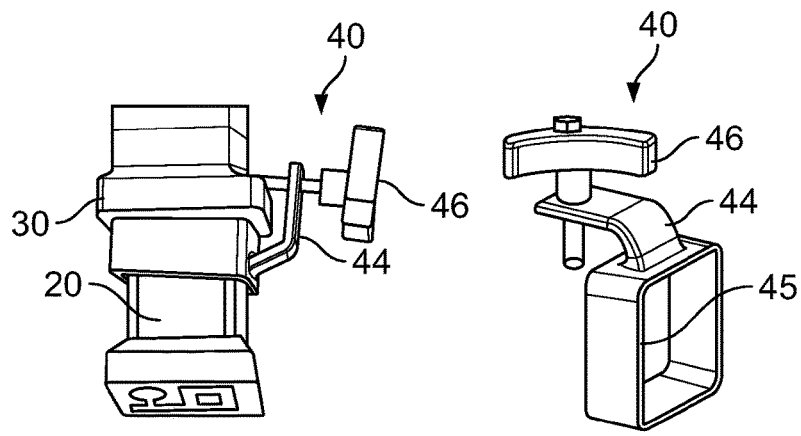
FIG. 1B shows a three dimensional top view of a second prior art device, in combination with a three dimensional perspective view of the torqueing sleeve of that device.
Figure 1C:
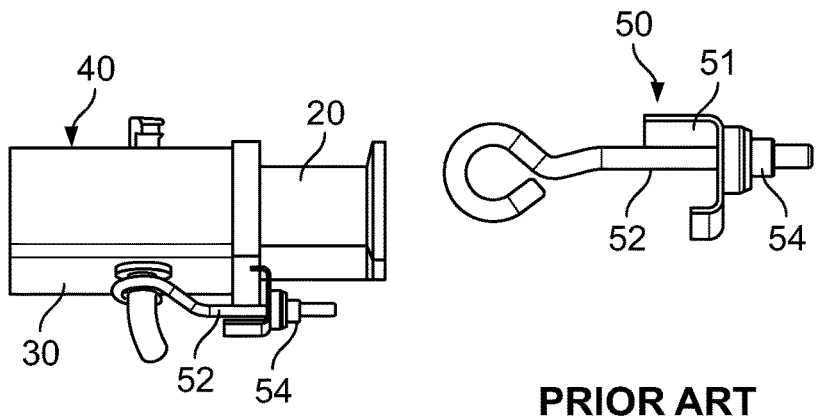
FIG. 1C shows a three dimensional top view of a third prior art device, in combination with a three dimensional top view of a leveraging pin in that device.
Figure 2:
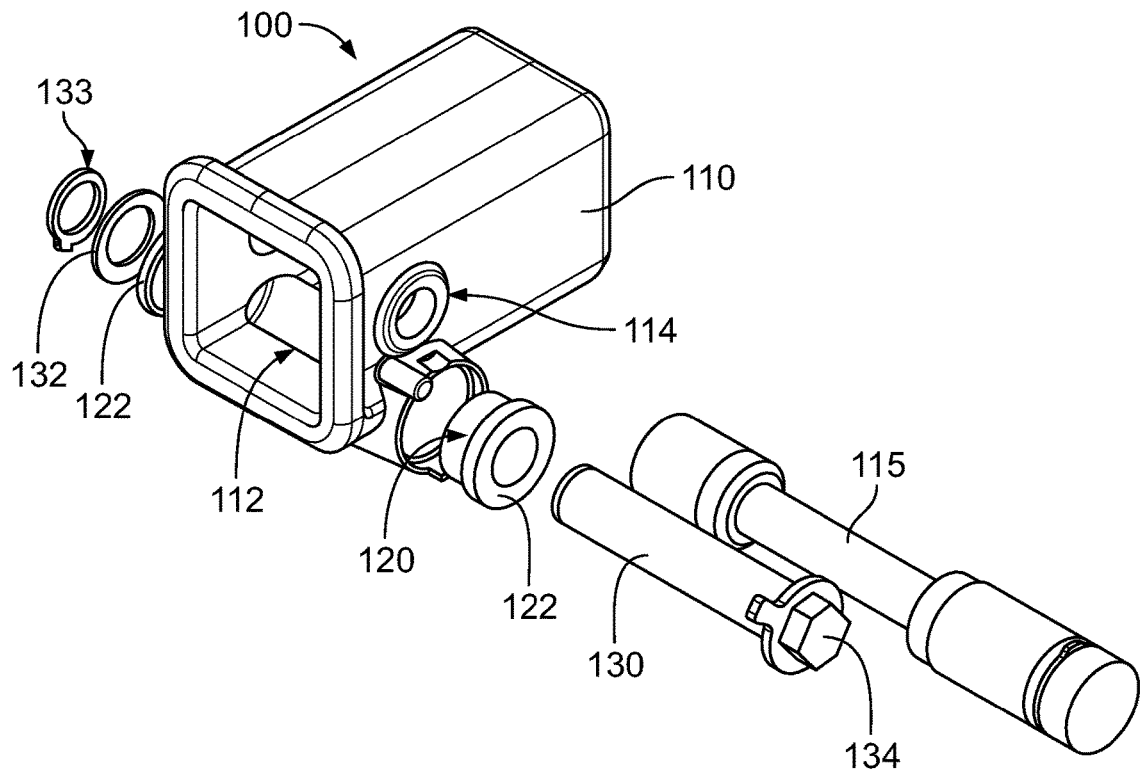
FIG. 2 is an three dimensional, exploded view of certain embodiments of the invention.

FIG. 2 shows an exploded view of certain embodiments of the anti-rattle device 100. The device includes a standard, generally square shaped receiving housing 110, typically 1.25 inches or 2.00 inches per industry norms. The housing 110 includes an open end having an accessory port 112 for receiving an accessory (e.g., the shank of a drawbar, towing device, or other accessory, all as noted above). The end opposite the accessory port 112 is affixed to the vehicle frame. A set of retaining pin ports 114 are provided so as to cooperate with corresponding apertures on the accessory itself (not shown) to allow for a pin 115 and clip or other similar securing means (not shown) to connect the accessory and the vehicle via device 100.

A locking barrel pin port 120 is provided, preferably along the lower facing of the housing 110. Polyurethane or other similarly compressible yet resilient bushings 122 are fitted within and/or along the ends of the locking barrel pin port 120. A locking barrel pin 130 is received within port 120 to allow the pin 130 to be rotatable therein. A washer 132 and clip assembly 133 may be provided on one end of pin 130 to ensure it remains in position within the port 120.

As noted above, the locking barrel pin 130 is provided with a flattened side (not shown). Additionally or alternatively, the pin may also be machined with a degree of ovality to allow for more easy rotation within the port 120. At the end opposite of washer 132 and clip assembly 133, a driving head 134 is provided. Ideally, the driving head 134 may take the shape of a hexagonal nut that can be driven using any standard wrench, although other arrangements (e.g., screw heads, integrated lever pin, etc.) are possible. Pin 130 may also include indicia to assist the user in determining whether the pin is engaged (i.e., urging the accessory upward) or disengaged (i.e., so that minimal force is being applied and/or the flattened portion of the pin is facing the corresponding, flat, lower facing of the accessory).

When rotated, the bushing(s) 122, port 120, and variable circumferential shape of the pin 130 can exert force on the flattened bottom side of an accessory (not shown) positioned adjacent to the pin 130/port 120 combination. This accessory is removably inserted into the device 100 via the accessory port 112.

While the locking barrel pin port 120 and pin 130 are illustrated along the bottom of the receiver, it will be understood that other configurations are possible. For example, the combination could be moved to the top-facing edge of the receiver. It may also be possible to design an anti-rattle device with these features located along one or both of the transverse sides of the receiver (i.e., effectively orthogonal to the ground). In the same manner, a plurality of locking barrel pins could be provided in separate locations to further secure the accessory in a plurality of ranges of motion.

Figure 3:
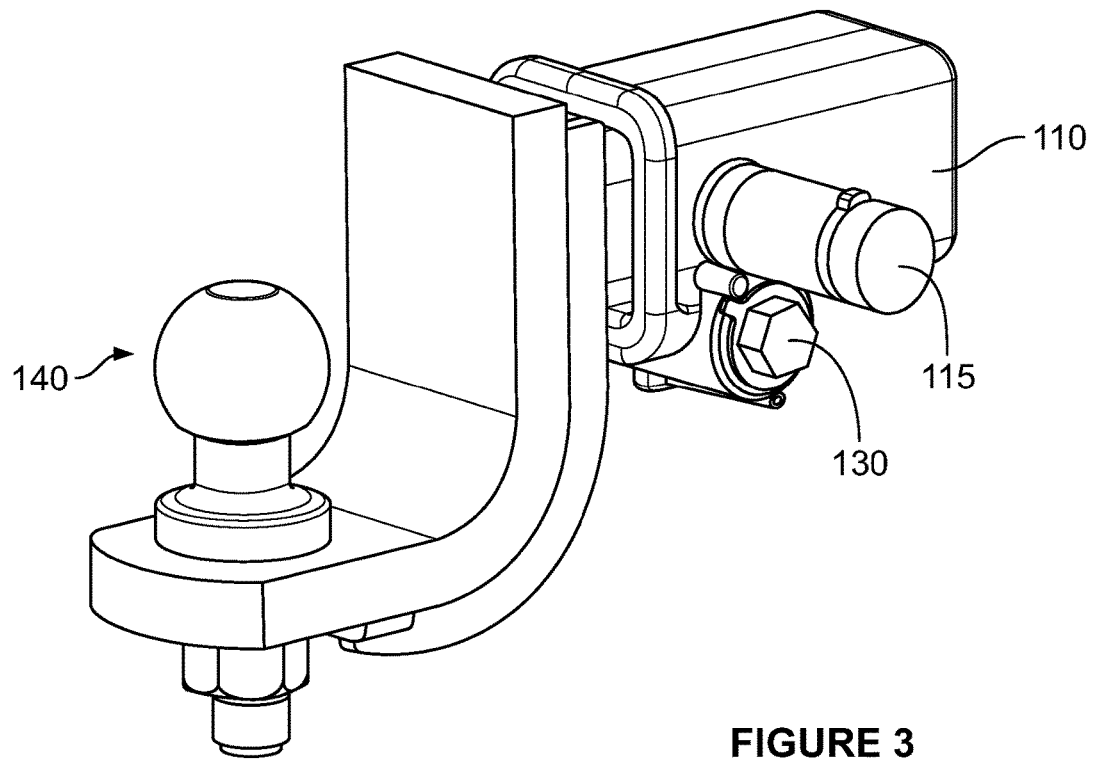
FIG. 3 is a three dimensional perspective view of certain embodiments of the invention engaged with a detachable hitch ball attachment.
Figure 4:
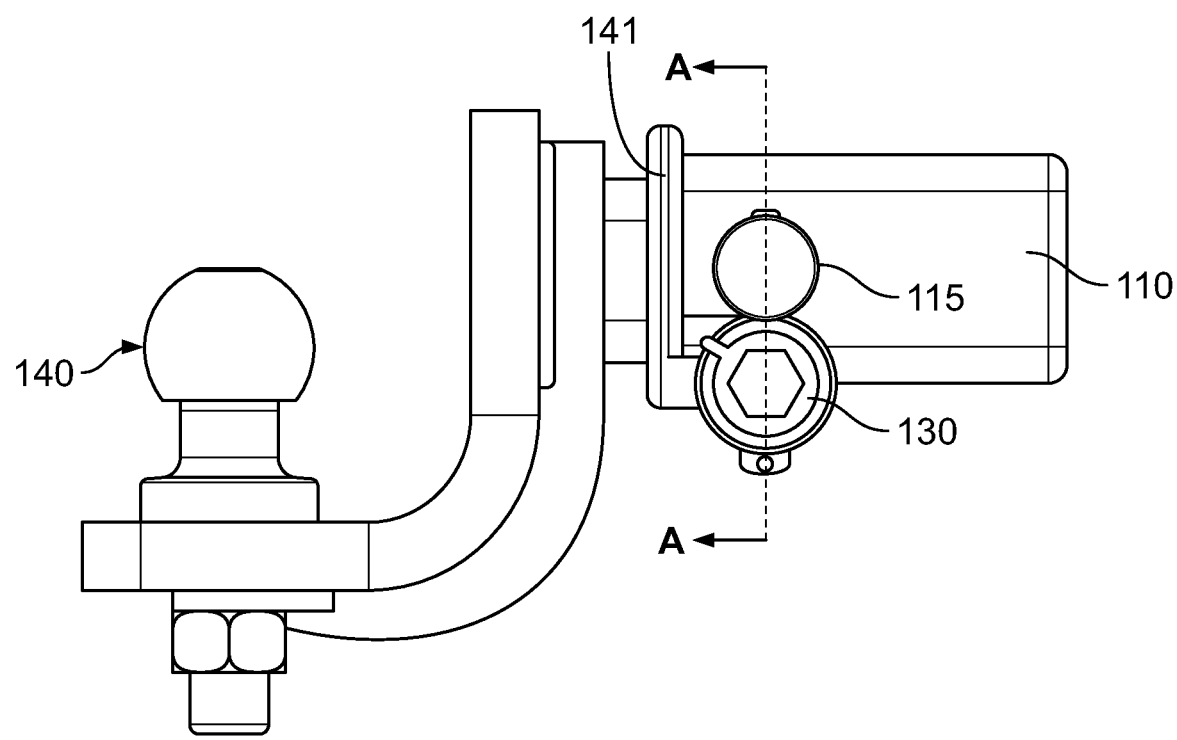
FIG. 4 is a side plan view of the embodiment shown in FIG. 3.
Figure 5:
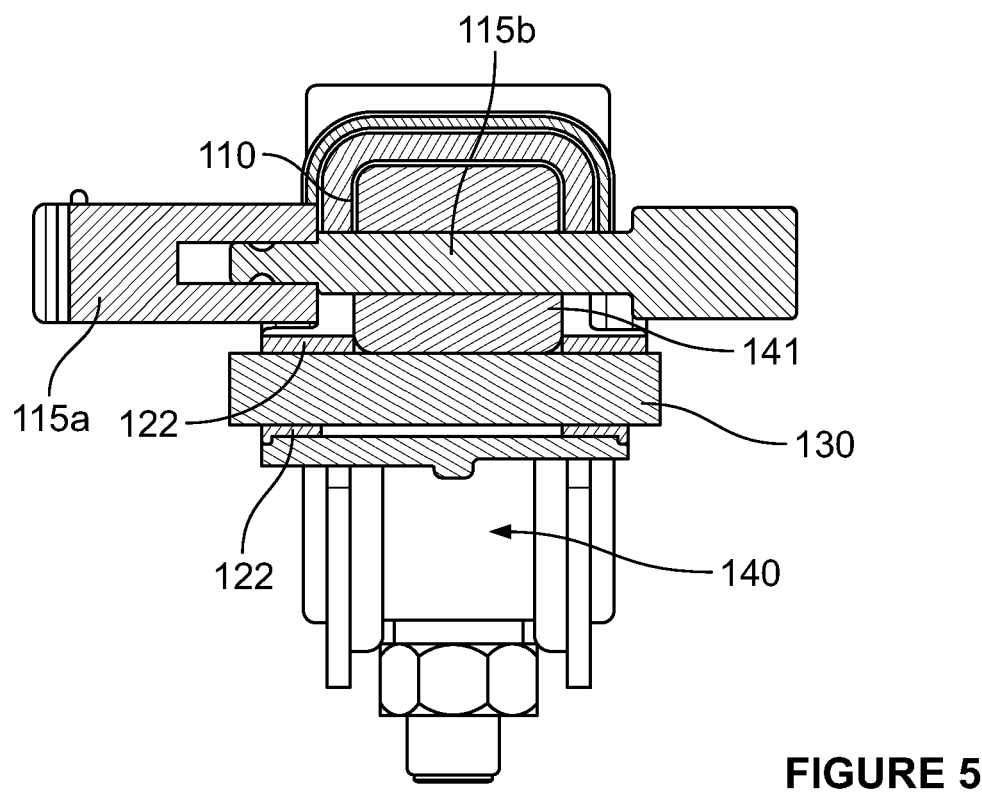
FIG. 5 is a sectional plan view taken along line A-A indicated in FIG. 4.

FIGS. 3, 4, and 5 shows a hitch ball accessory 140 received in housing 110 and secured by a standard lockable retaining pin 115 inserted through the corresponding retaining pin ports (not directly visible) of the housing 110 and accessory 140. As best seen in the back view shown in FIG. 5 (which is, itself, taken along line A-A in FIG. 4), barrel pin 130 urges the drawbar of the accessory 140 upward to prevent rattling or other movement. Notably, retaining pin 115 is illustrated with an optional two-piece construction, including lockable end 115a and an attachment body 115b.

In the illustrated embodiment of FIG. 5, the bushings 122 are not overloaded and therefore do not compress. Thus the flattened or otherwise smaller diameter of barrel pin 130 is orthogonal to the ground (i.e., the illustrated cross section in FIG. 5 shows barrel pin 130 at its smallest diameter). However, upon rotation of barrel pin 130, its larger diameter facing would align orthogonal to the ground and urge the solid or hollowed portion of the shank 141 of the hitch ball accessory 140 upward.

While the inventive system preferably uses polyurethane bushes in combination with a locking barrel pin to engineer a range of tolerances into the system, other similarly compressible yet resilient materials may be employed. In the same manner, the receiving housing and pins are expected to be made from appropriate grades of steel owing to its superior strength and relatively inexpensive cost. While the system is preferably engineered to accommodate loads of up to approximately 500 kg, alternative sizing and selection of materials may enable a wider range in this regard. Also, because the locking barrel pin engages the accessory transversely (relative to how the accessory may be received in the hitch), the load is more evenly distributed in comparison to the sleeve and wedge arrangements described above. Consequently, the inventive design is less likely to loosen or wear during service, while its integrated nature eliminates aesthetic issues with respect to scrapes and scratches.

The anti-rattle device 100 described above is integrated with the original equipment. Through use of a more permanent or locking washer and clip assembly, it would be possible to prevent the removal of the locking barrel pin, thereby providing a system without any removable, loose parts. In the same manner, the distribution of load across the entire facing of the locking barrel pin and the use of bushings reduces the likelihood of damage or wear. Finally, the system can be easily engaged and disengaged with minimal effort and common tools (i.e., a wrench).

Example

Two prototypes were manufactured in standard receiver sizes (1.25 inches and 2.00 inches) in accordance with the embodiment disclosed in FIGS. 2 and 3. Each prototype was cycled tested at 9.8 kN for 200,000 cycles at 20 degree test angle. Noise was substantially reduced in comparison to standard hitches tested under the same conditions. Further, no premature wear was observed to either the bushes or the locking barrel pin.

Although the present embodiments have been illustrated in the accompanying drawings and described in the foregoing detailed description, it is to be understood that the bike carrier is not to be limited to just the embodiments disclosed, but that the bike carrier described herein is capable of numerous rearrangements, modifications and substitutions. The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. An anti-rattle hitch device comprising:
a hollow, tubular housing oriented along a longitudinal axis and defined by a receiving aperture at one end, a pair of opposing, transverse side wall sections and a pair of opposing top and bottom wall sections;
a locking barrel pin port formed within one of the top, bottom, or side walls and extending through to the opposing top, bottom, or side wall;
at least one compressible bushing lining an interior portion the locking barrel pin port;
a locking barrel pin having a longitudinal length and at least one section of longitudinal length in which a diameter of the pin varies; and
wherein the locking barrel pin, when inserted in the locking barrel pin port, does not bisect or obstruct a body inserted into the receiving aperture.

2. The device of claim 1 wherein the at least one section of longitudinal length includes a flattened exterior section and a remaining portion of the longitudinal length is curved.

3. The device of claim 2 wherein the remaining portion of the longitudinal length has a circular cross sectional shape.

4. The device of claim 1 wherein the locking barrel pin has an oval cross sectional shape at the at least one section of longitudinal length.

5. The device of claim 1 wherein the locking barrel pin includes a rotational engagement head at one end.

6. The device of claim 1 further comprising a pair of linearly aligned retaining pin ports formed within one of the top, bottom, or side walls and the opposing top, bottom, or side wall associated therewith.

7. The device of claim 1 wherein a transverse line connecting the pair of linearly aligned retaining ports is parallel to the longitudinal length of locking barrel pin when the locking barrel pin is inserted within the locking barrel pin port.

8. The device of claim 1 wherein the receiving aperture defines a quadrilateral shape.

9. The device of claim 8 wherein the tubular housing also incorporates the quadrilateral shape along the longitudinal axis.

10. The device of claim 1 further comprising a towing accessory received within the receiving aperture, wherein the locking barrel pin engages an edge the towing accessory without penetrating or passing through the towing accessory.

11. An anti-rattle hitch comprising:
a hollow, tubular housing having an accessory aperture at one end;
a locking barrel pin port formed within one of a top, bottom, or side walls and extending through to the opposing top, bottom, or side wall of the housing;
a locking barrel pin having a longitudinal length and at least one section of longitudinal length in which a diameter of the pin varies, wherein the locking barrel pin, when inserted in the locking barrel pin port, does not bisect or obstruct a body inserted into the receiving aperture.

12. The hitch of claim 11 further comprising a bushing at least partially encasing the locking barrel pin.

13. The hitch of claim 11 wherein the housing is integrated as part of a receiver hitch.

14. An anti-rattle hitch system comprising:
a receiving member defined by a plurality of sidewalls surrounding an opening into which a towing accessory may be inserted;
a pair of retaining apertures formed within opposing sidewalls of the receiving member into which a retaining pin is configured to be inserted, wherein when a towing accessory is inserted in the member, the retaining pin passes through the towing accessory to secure it within the receiving member;
a channel formed in one of the sidewalls;
a locking barrel pin positioned within the channel wherein at least one section of longitudinal length in which a diameter of the locking barrel pin varies; and
wherein the locking barrel pin may be selectively repositioned within the channel so that, when a towing accessory is inserted in the receiving member, the locking barrel pin urges the towing accessory into secured contact with at least one of the plurality of sidewalls not having the channel and the locking barrel pin, when inserted in the channel does not bisect or obstruct a body inserted into the receiving aperture.

15. The system of claim 14 wherein the locking barrel pin is at least partially encased within a compressible bushing.

16. The system of claim 14 wherein, when the retaining pin is inserted into the retaining apertures, the retaining pin is oriented parallel to the locking barrel pin.

* * * * *